US009016692B2

(12) United States Patent
Haubold et al.

(10) Patent No.: US 9,016,692 B2
(45) Date of Patent: Apr. 28, 2015

(54) SEALING RINGS FOR A LABYRINTH SEAL

(75) Inventors: Thomas Haubold, Wehrheim (DE); Andreas Kohns, Frankfurt (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 164 days.

(21) Appl. No.: 12/954,104

(22) Filed: Nov. 24, 2010

(65) Prior Publication Data

US 2011/0127728 A1    Jun. 2, 2011

(30) Foreign Application Priority Data

Nov. 27, 2009  (DE) .......................... 10 2009 055 914

(51) Int. Cl.
F16J 15/447    (2006.01)
F03D 11/00    (2006.01)

(52) U.S. Cl.
CPC .......... *F03D 11/0008* (2013.01); *Y02E 10/722* (2013.01)

(58) Field of Classification Search
USPC .......................... 277/415, 416, 412, 411, 418
See application file for complete search history.

(56) References Cited

U.S. PATENT DOCUMENTS

| | | | | |
|---|---|---|---|---|
| 4,148,494 A * | 4/1979 | Zelahy et al. | .................. | 277/415 |
| 4,330,133 A * | 5/1982 | Palfreyman et al. | .......... | 277/412 |
| 4,744,725 A * | 5/1988 | Matarese et al. | .......... | 415/173.4 |
| 5,024,884 A * | 6/1991 | Otfinoski | ...................... | 428/328 |
| 5,076,897 A * | 12/1991 | Wride et al. | .................. | 205/110 |
| 5,185,217 A * | 2/1993 | Miyamoto et al. | ............ | 428/627 |
| 5,264,011 A * | 11/1993 | Brown et al. | ................... | 51/309 |
| 5,476,363 A | 12/1995 | Freling et al. | | |
| 5,484,665 A | 1/1996 | Singh et al. | | |
| 5,536,022 A * | 7/1996 | Sileo et al. | ..................... | 277/415 |
| 5,547,340 A * | 8/1996 | Dalton et al. | .............. | 415/121.2 |
| 5,660,320 A * | 8/1997 | Hoffmuller et al. | ........ | 228/122.1 |
| 5,702,574 A * | 12/1997 | Foster et al. | ............. | 204/224 R |
| 5,935,407 A * | 8/1999 | Nenov et al. | ................... | 205/183 |
| 6,254,700 B1 * | 7/2001 | Hermanek | ..................... | 148/403 |
| 6,533,285 B2 * | 3/2003 | Nava et al. | .................... | 277/415 |
| 6,706,319 B2 * | 3/2004 | Seth et al. | ..................... | 427/190 |

(Continued)

FOREIGN PATENT DOCUMENTS

DE    4436186    5/1995
DE    69321295    4/1999

(Continued)

OTHER PUBLICATIONS

German Search Report dated Mar. 17, 2011 for the counterpart German patent application.

*Primary Examiner* — Kristina Fulton
*Assistant Examiner* — Eugene G Byrd
(74) *Attorney, Agent, or Firm* — Timothy J. Klima; Shuttleworth & Ingersoll, PLC

(57) ABSTRACT

In sealing rings for a labyrinth seal that are arranged on a rotationally symmetrical component and in frictional contact with a stationary run-in layer, a part of the sealing ring (8) that contacts the run-in layer is in the form of a wear protection ring segment (15) that is built up on a truncated sealing ring (14) and which includes a metal matrix (16) with wear protection particles (13) embedded therein. The manufacture of the wear protection ring segment is carried out by laser build-up welding, wherein the proportion of wear protection particles contained in the metal powder flow supplied to the laser beam can be controlled and increased in an edge or tip region of the sealing ring.

20 Claims, 2 Drawing Sheets

(56) References Cited

U.S. PATENT DOCUMENTS

| | | | |
|---|---|---|---|
| 6,780,458 B2 * | 8/2004 | Seth et al. | 427/201 |
| 7,165,946 B2 * | 1/2007 | Nava et al. | 416/241 R |
| 7,537,809 B2 * | 5/2009 | Ochiai et al. | 427/580 |
| 7,597,538 B2 | 10/2009 | Mons et al. | |
| 7,836,591 B2 * | 11/2010 | Allen et al. | 29/888.021 |
| 7,836,593 B2 * | 11/2010 | Allen | 29/889.1 |
| 7,918,460 B2 * | 4/2011 | Ochiai et al. | 277/412 |
| 2006/0213435 A1 * | 9/2006 | Friedrich | 118/302 |
| 2007/0132193 A1 * | 6/2007 | Wolfe et al. | 277/415 |
| 2008/0284109 A1 * | 11/2008 | Northfield | 277/412 |
| 2009/0041607 A1 | 2/2009 | Meier et al. | |

FOREIGN PATENT DOCUMENTS

| | | |
|---|---|---|
| DE | 69227722 | 7/1999 |
| DE | 60027258 | 1/2007 |
| DE | 102006009860 | 9/2007 |
| EP | 0573928 | 12/1993 |
| EP | 1108857 | 6/2001 |
| EP | 1785649 | 5/2007 |

* cited by examiner

SEALING RINGS FOR A LABYRINTH SEAL

This application claims priority to German Patent Application DE102009055914.0 filed Nov. 27, 2009, the entirety of which is incorporated by reference herein.

The invention pertains to sealing rings for a labyrinth seal that are arranged on a rotationally symmetrical component and in frictional contact with a stationary run-in layer, particularly for aircraft gas turbines.

Labyrinth seals are, in principle, contactless shaft seals realized in the form of a smooth gap labyrinth or tumbling collar labyrinth, wherein the sealing effect of these labyrinth seals is based on the elongation of the sealing path due to the arrangement or alternate arrangement of sealing rings (rigid circumferential sealing lips) on the rotating part and/or the stationary housing part. In stationary gas turbines and aircraft engines, the labyrinth seals arranged in the region of the compressors and turbines should prevent a backflow of the air and ensure a minimal pressure loss and therefore a high efficiency of the gas turbine. A corresponding sealing system for gas turbines comprises sealing fins that are arranged on the rotor blade tips—and form sealing rings that lie adjacent to one another on the outer circumference of the rotor—and sealing rings that are arranged adjacent to one another on a shaft or the connecting flanges between the rotor disks and cooperate with the inner circumferential surface of a run-in layer that is rigidly mounted in the gas turbine. During the run-in of the gas turbine, the rotating sealing rings rub against the opposite run-in layer and cut into this layer in order to thusly achieve a minimal gap dimension. However, the distance between the run-in layer and the sealing rings may fluctuate during the operation of the gas turbine due to the thermal expansion of the components and a natural deflection.

Due to the friction between the run-in layer and the sealing rings, the upper part of the sealing rings that engages into the run-in layer is subjected to wear such that the required sealing effect is no longer ensured and the sealing rings need to be rebuilt. This is realized by cutting off approximately two thirds of the sealing ring, subsequently rebuilding the sealing ring of the same material by laser build-up welding and then carrying out a finishing process. This repair procedure is elaborate and does not provide protection from future wear. In order to protect the sealing rings (or blade tips) from wear, it is furthermore known to provide the region of the sealing rings that contacts the run-in layer with a wear protection layer that is galvanically or electrolytically applied onto the sealing rings that are initially fabricated with a machining tolerance and then machined again. However, this method is very time-consuming and cost-intensive. In addition, access to the surfaces subjected to wear and to be coated is limited such that a uniform coating with the wear protection material and a sufficient wear protection are not always ensured during the plasma spraying process.

The invention is based on the objective of realizing sealing rings that are in frictional contact with a run-in layer (friction partner) and intended for a labyrinth seal, in particular, for gas turbines in such a way that a superior wear protection is ensured, wherein the invention also aims to disclose a method for cost-efficiently manufacturing sealing rings that are highly resistant to wear.

The basic idea of the invention is that the part of the sealing rings that comes in frictional contact with a friction partner during operation is in the form of a wear protection ring segment that is built up on a truncated sealing ring and includes a metal matrix with wear protection particles embedded therein. The thusly realized sealing rings are characterized by low wear in the entire contact region with the run-in layer and ensure a high sealing effect over a long period of time.

The inventive sealing rings are manufactured in such a way that only truncated sealing rings are initially formed on a rotationally symmetrical component and a mixture of a metal powder and wear protection particles is supplied to the truncated seals and fused thereon layer-by-layer by a laser beam. The method is much more cost-efficient than other wear protection methods and furthermore provides improved wear protection. It can also be used in the repair of worn-out sealing rings.

In another embodiment of the invention, the proportion of wear protection particles in the wear protection ring segment may be greater toward the edge and/or the tip of the sealing ring than in other regions—that are subjected to less or no wear—in accordance with the load.

The arrangement of the wear protection particles is preferably limited to the edge region of the wear protection ring segment.

In another embodiment of the invention, the metal matrix can be made of the same material as the truncated seal or of another material. The wear protection particles are preferably cubic boron nitride (CBN).

According to the inventive method, the proportion of wear protection particles contained in the flow of metal powder supplied to the laser beam can be controlled such that a particularly high wear protection effect can be achieved in certain regions of the sealing ring.

In another embodiment of the invention, a heat treatment of the entire rotationally symmetrical component or a local heat treatment in the region of the sealing rings is carried out after building up the wear protection ring segments on the truncated sealing rings. It would also be possible to forgo the heat treatment under certain circumstances, for example, when a material that differs from the base material is used for the metal matrix with embedded wear protection particles.

One exemplary embodiment of the invention is described below with reference to the drawings, in which FIG. 1 shows a partial view of the turbine of an aircraft engine with labyrinth seals arranged in this region;

Figure 1:
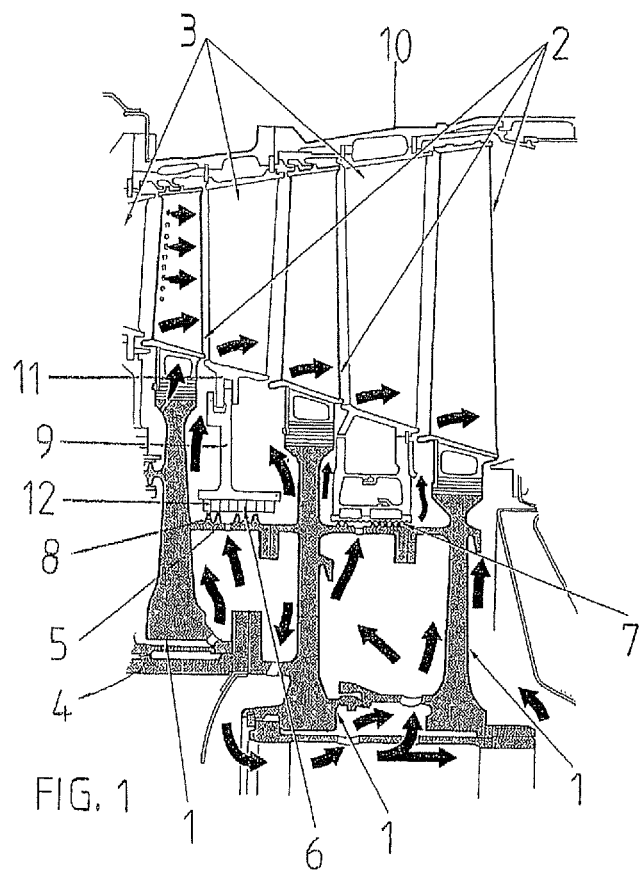

In the partial view of the turbine of an aircraft engine illustrated in FIG. 1, the arrows indicate the flow direction of the turbine cooling air. The turbine disks are identified by the reference symbol 1 and the turbine blades are identified by the reference symbol 2. Guide vanes 3 are respectively assigned to the turbine blades 2. The turbine disks 1 are connected to a turbine shaft 4 and connected to one another by connecting flanges 5. A first labyrinth seal 6 and a second labyrinth seal 7 are arranged in the region between the turbine disks 1 and ensure the lowest pressure loss possible between the two turbines stages. The labyrinth seals 6, 7 comprise adjacently arranged sealing rings 8 (sealing lips) that are integrally formed on the respective connecting flange 5 and tapered toward the free end, wherein these sealing rings rotate together with the turbine disks 1. The first labyrinth seal 6 comprises a stationary run-in layer 12 that is fixed on a stator 11 connected to the engine housing 10 by a holding element 9 and has a honeycomb structure in this case, but may also be realized in the form of another suitable friction partner such as, for example, felt metal that allows the tips of the sealing rings 8 to penetrate into the run-in layer 12. The sealing gap of the labyrinth seal 6 can be maintained very small in this fashion.

Figure 4:
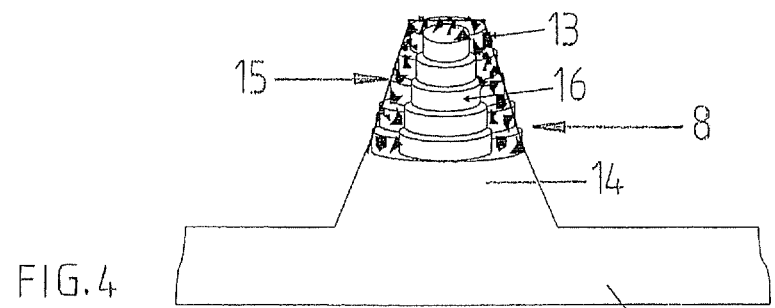
FIG. 4 shows a schematic sectional representation of a sealing ring, in which the incorporation of wear protection particles is limited to the edge region of the sealing ring.
Figure 3:
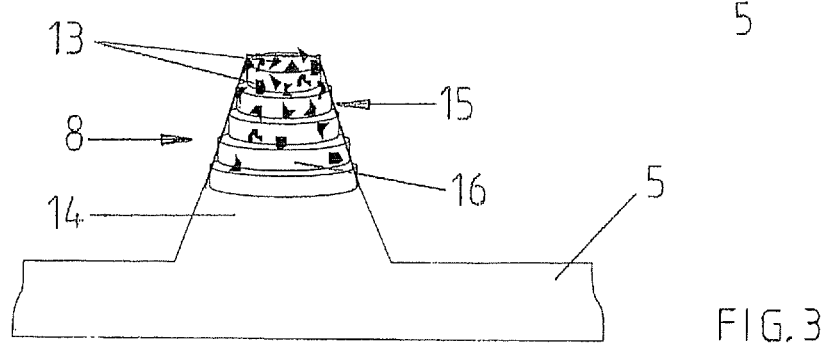
FIG. 3 shows a schematic sectional representation of a sealing ring with a graduated distribution of wear protection particles over the height thereof.

The wear of the sealing rings 8 to be expected due to the frictional contact between the sealing rings 8 and the run-in layer 12 is counteracted in that wear protection particles 13—for example of a cubic boron nitride—are incorporated into the upper part of the sealing rings 8 that are subjected to the frictional contact with the run-in layer 12. According to FIG. 3, the proportion of wear protection particles 13 incorporated into a metal matrix 16 in the upper part of the sealing rings 8 may continuously increase toward the tip of the sealing rings 8. In addition, the incorporation of wear protection particles 13 may be limited to the edge region in the upper part of the sealing rings 8 as shown in FIG. 4. In this case, the proportion of wear protection particles 13 may furthermore increase from the bottom toward the top in the edge region.

Figure 2:
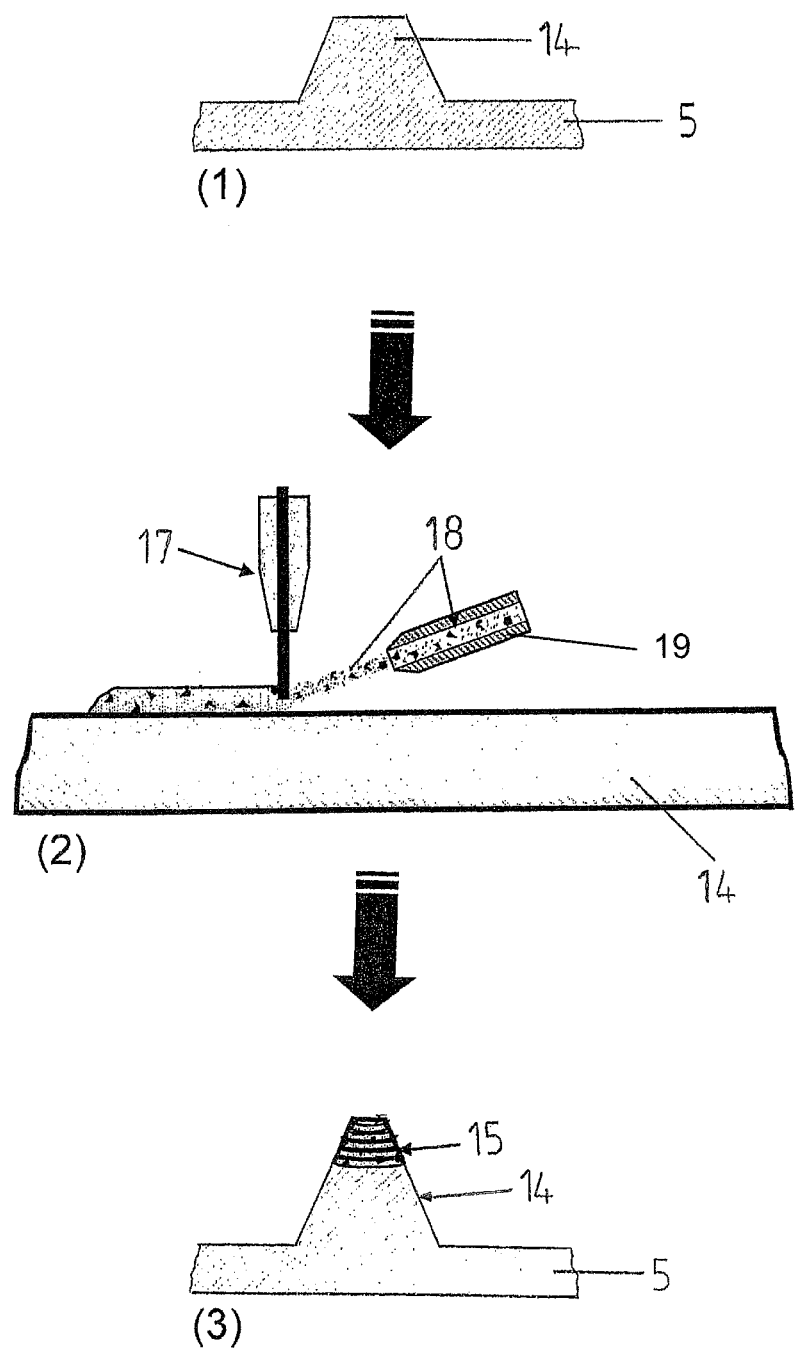
FIG. 2 shows a graphical representation of the process sequence for realizing sealing rings.

The above-described sealing rings 8 are manufactured in such a way that, during the fabrication of a rotationally symmetrical component provided with sealing rings 8 such as, for example, a turbine disk 1 for an aircraft engine, only truncated sealing rings 14 are initially realized on the component, in this case the connecting flange 5 between two turbine disks 1. A wear protection ring segment 15 having wear protection particles 13 embedded in a metal matrix 16 is subsequently built up on the truncated sealing rings 14 by laser build-up welding. According to FIG. 2, the wear protection ring segment 15 is built up on the respective truncated sealing ring 14 with the aid of a metal powder/wear protection particle mixture 18 that is supplied to a laser beam 17 by a powder nozzle 19. The metal powder forming the base material is fused on by the laser beam 17 and forms the metal matrix 16, in which the wear protection particles 13 are embedded. During the layer-by-layer application of the fused-on metal powder, the proportion of wear protection particles 13 in the metal powder/wear protection particle mixture 18 can be controlled in such a way that it continuously increases in each successive layer (FIG. 3) or the wear protection particles 13 are only situated in the edge region of the wear protection ring segment 15 produced on the truncated sealing ring 14. After the build-up of the wear protection ring segment 15 is completed, a heat treatment (stress relief annealing) of the entire component or only a local heat treatment is carried out, wherein it would also be possible, if applicable, to forgo this heat treatment under optimized process parameters. It is also possible that the metal powder used for producing the wear protection ring segment 15 is not made of the truncated sealing ring material, but of another material.

LIST OF REFERENCE SYMBOLS

1 Turbine disk
2 Turbine blade
3 Guide vanes
4 Turbine shaft
5 Connecting flange
6 First labyrinth seal
7 Second labyrinth seal
8 Sealing rings
9 Holding element
10 Engine housing
11 Stator
12 Run-in layer (friction partner)
13 Wear protection particles
14 Truncated sealing ring
15 Wear protection ring segment
16 Metal matrix
17 Laser beam
18 Metal powder/wear protection particle mixture
19 Powder nozzle

What is claimed is:
1. A labyrinth seal, comprising:
a stationary run-in layer having an abradable surface;
a sealing ring arranged on a rotationally symmetrical component for frictional contact with the stationary run-in layer to achieve a minimal gap dimension, the sealing ring comprising:
a truncated portion formed on the rotationally symmetrical component;
a wear protection ring segment for frictional contact with the run-in layer, the wear protection ring segment layered over the truncated portion and including a fused metal matrix mixture comprising metal powder and wear protection particles mixed within the metal powder, the wear protection particles having a maximum dimension less than a thickness of the wear protection ring segment;
the wear protection ring segment including a first central portion positioned radially away from a connecting flange of the rotationally symmetrical component; a first side portion positioned axially on a first side of the central portion and extending from the central portion to a first position radially toward the connecting flange and a second side portion positioned axially on a second side of the central portion and extending from the central portion to a second position radially toward the connecting flange;
the wear protection ring segment including a plurality of contiguous side-by-side layers of the metal matrix; the plurality of side-by-side layers extending from the first position, through the central portion, to the second position;
wherein the metal matrix mixture includes a first metal matrix mixture and a second metal matrix mixture, the first metal matrix mixture having a first proportion of wear protection particles to metal powder, the second metal matrix mixture having a second proportion of wear protection particles to metal powder, the plurality of layers includes a first layer positioned in a direction toward a free tip of the wear protection ring segment consisting of the first metal matrix mixture and a second layer positioned in a direction toward the rotationally symmetrical component consisting of the second metal matrix mixture, with the first proportion of wear protection particles to metal powder of the first layer being greater than the second proportion of wear protection particles to metal powder of the second layer.

2. The labyrinth seal of claim 1, wherein a proportion of wear protection particles mixed in the metal matrix increases toward an edge region of the wear protection ring segment.

3. The labyrinth seal of claim 2, wherein the metal matrix is constructed of a same material as the truncated sealing ring.

4. The labyrinth seal of claim 3, wherein the wear protection particles include cubic boron nitride (CBN).

5. The labyrinth seal of claim 2, wherein the metal matrix is constructed of a different material than the truncated sealing ring.

6. The labyrinth seal of claim 5, wherein the wear protection particles include cubic boron nitride (CBN).

7. The labyrinth seal of claim 1, wherein the arrangement of wear protection particles is limited to an edge region of the wear protection ring segment.

8. The labyrinth seal of claim 7, wherein the metal matrix is constructed of a same material as the truncated sealing ring.

9. The labyrinth seal of claim 8, wherein the wear protection particles include cubic boron nitride (CBN).

10. The labyrinth seal of claim 7, wherein the metal matrix is constructed of a different material than the truncated sealing ring.

11. The labyrinth seal of claim 10, wherein the wear protection particles include cubic boron nitride (CBN).

12. The labyrinth seal of claim 1, wherein the wear protection particles include cubic boron nitride (CBN).

13. The labyrinth seal of claim 1, wherein the sealing ring is a sealing ring of an aircraft gas turbine.

14. A method for manufacturing a labyrinth seal, comprising:
providing a stationary run-in layer having an abradable surface;
providing a sealing ring arranged on a rotationally symmetrical component for frictional contact with the stationary run-in layer to achieve a minimal gap dimension, the providing the sealing ring comprising:
providing a truncated portion formed on the rotationally symmetrical component;
providing a wear protection ring segment for frictional contact with the run-in layer, the wear protection ring segment layered over the truncated portion and including a fused metal matrix mixture comprising metal powder and wear protection particles mixed within the metal powder, the wear protection particles having a maximum dimension less than a thickness of the wear protection ring segment;
the wear protection ring segment including a first central portion positioned radially away from a connecting flange of the rotationally symmetrical component; a first side portion positioned axially on a first side of the central portion and extending from the central portion to a first position radially toward the connecting flange and a second side portion positioned axially on a second side of the central portion and extending from the central portion to a second position radially toward the connecting flange;
the wear protection ring segment including a plurality of contiguous side-by-side layers of the metal matrix; the plurality of side-by-side layers extending from the first position, through the central portion, to the second position;
wherein the metal matrix mixture includes a first metal matrix mixture and a second metal matrix mixture, the first metal matrix mixture having a first proportion of wear protection particles to metal powder, the second metal matrix mixture having a second proportion of wear protection particles to metal powder, the plurality of layers includes a first layer positioned in a direction toward a free tip of the wear protection ring segment consisting of the first metal matrix mixture and a second layer positioned in a direction toward the rotationally symmetrical component consisting of the second metal matrix mixture, with the first proportion of wear protection particles to metal powder of the first layer being greater than the second proportion of wear protection particles to metal powder of the second layer;
initially forming the truncated portion on the rotationally symmetrical component;
subsequently forming the wear protection ring segment over the truncated portion, the wear protection ring segment formed over the truncated portion by supplying the metal powder and wear protection particle mixture to the truncated portion and fusing the mixture onto the truncated portion layer-by-layer with a laser beam.

15. The method of claim 14, and further comprising increasing a proportion of wear protection particles in the mixture supplied to the laser beam near at least one of a tip region and an edge region of the sealing ring.

16. The method of claim 15, and further comprising heat treating the sealing ring after forming the wear protection ring segment.

17. The method of claim 16, wherein the heat treatment is performed locally only in a region of the sealing ring.

18. The method of claim 14, and further comprising limiting wear protection particles in the mixture to an edge region of the sealing ring.

19. The method of claim 18, and further comprising heat treating the sealing ring after forming the wear protection ring segment.

20. The method of claim 19, wherein the heat treatment is performed locally only in a region of the sealing ring.

* * * * *